(12) United States Patent
Okuda

(10) Patent No.: US 8,897,633 B2
(45) Date of Patent: *Nov. 25, 2014

(54) IN-VEHICLE CAMERA UNIT HAVING CAMERA BUILT INTO BODY

(71) Applicant: Denso Corporation, Kariya (JP)

(72) Inventor: Syo Okuda, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/031,103

(22) Filed: Sep. 19, 2013

(65) Prior Publication Data

US 2014/0016919 A1    Jan. 16, 2014

Related U.S. Application Data

(63) Continuation-in-part of application No. 13/331,339, filed on Feb. 10, 2011, now Pat. No. 8,548,315, and a continuation-in-part of application No. 13/366,799, filed on Feb. 6, 2012.

(30) Foreign Application Priority Data

Dec. 21, 2010  (JP) .................................. 2010-284773
Feb. 10, 2011  (JP) .................................. 2011-027565

(51) Int. Cl.
  *G03B 17/08*  (2006.01)
  *G03B 17/56*  (2006.01)
  *B60R 13/07*  (2006.01)
  *B60R 11/04*  (2006.01)
  *B60R 11/00*  (2006.01)

(52) U.S. Cl.
  CPC .............. *G03B 17/565* (2013.01); *B60R 13/07* (2013.01); *B60R 2011/0026* (2013.01); *B60R 11/04* (2013.01)

USPC .............................. 396/25; 396/427; 396/429

(58) Field of Classification Search
  CPC ...... G03B 17/08; G03B 17/48; G03B 17/561; G03B 17/565
  USPC ................................. 396/25, 27, 29; 348/148
  See application file for complete search history.

(56) References Cited

U.S. PATENT DOCUMENTS 6,386,742 B1   5/2002  DeLine et al.
6,799,904 B2  10/2004  Schaefer et al.
(Continued)

FOREIGN PATENT DOCUMENTS

JP   05-032191   4/1993
JP   09-024775   1/1997
(Continued)

OTHER PUBLICATIONS

Office Action issued Jan. 29, 2013 in corresponding Japanese Application No. 2011-027565 with English translation.

(Continued)

*Primary Examiner* — William Perkey
(74) *Attorney, Agent, or Firm* — Harness, Dickey & Pierce, PLC

(57) ABSTRACT

An in-vehicle camera unit has a body to which a lens is attached and prevention members that prevent water drops from falling on the lens. Specifically the body has a top surface where the lens is arranged, a front surface of the lens being exposed to an outside of the body. The prevention member is provided in or on the top surface across the front-back direction of the body.

5 Claims, 9 Drawing Sheets

(56) References Cited

U.S. PATENT DOCUMENTS

| | | |
|---|---|---|
| 7,111,996 B2 | 9/2006 | Seger et al. |
| 7,480,149 B2 | 1/2009 | DeWard et al. |
| 8,548,315 B2 * | 10/2013 | Okuda .................. 396/25 |
| 2003/0010890 A1 | 1/2003 | Sakata |
| 2003/0059218 A1 | 3/2003 | Sakata et al. |
| 2009/0046150 A1 | 2/2009 | Hayakawa et al. |
| 2010/0265328 A1 | 10/2010 | Chou |
| 2012/0026330 A1 | 2/2012 | Huelsen et al. |
| 2012/0033079 A1 | 2/2012 | Karl |
| 2012/0075471 A1 | 3/2012 | Seger et al. |
| 2012/0081544 A1 | 4/2012 | Wee |
| 2012/0155855 A1 | 6/2012 | Okuda |
| 2013/0050489 A1 | 2/2013 | Taylor et al. |
| 2014/0016919 A1 * | 1/2014 | Okuda .................. 396/25 |
| 2014/0160284 A1 | 6/2014 | Achenbach et al. |

FOREIGN PATENT DOCUMENTS

| | | |
|---|---|---|
| JP | 11-078717 | 2/1999 |
| JP | 2002-341432 | 11/2002 |
| JP | 2002-374441 | 12/2002 |
| JP | 2003-025928 | 1/2003 |
| JP | 2004-075033 | 3/2004 |
| JP | 2005-192114 | 7/2005 |
| JP | 2012-080517 | 4/2012 |

OTHER PUBLICATIONS

Office Action issued Jan. 9, 2013 in corresponding Japanese Application No. 2010-284773 with English translation.

Office Action issued Jul. 17, 2014 in related co-pending U.S. Appl. No. 13/366,799.

Office Action issued Mar. 18, 2014 in corresponding Japanese Application No. 2013-143221 (with English translation).

* cited by examiner

IN-VEHICLE CAMERA UNIT HAVING CAMERA BUILT INTO BODY

CROSS-REFERENCE TO RELATED APPLICATION

This application is a continuation-in-part of U.S. patent application Ser. No. 13/331,339 filed on Dec. 20, 2011 and a continuation-in-part of U.S. patent application Ser. No. 13/366,799 filed Feb. 6, 2012. This application is based on and claims the benefit of priority from earlier Japanese Patent Application No. 2010-284773 filed on Dec. 21, 2010 and from earlier Japanese Patent Application No. 2011-027565 filed on Feb. 10, 2011. The entire disclosures of each of the above applications are incorporated herein by reference.

BACKGROUND OF THE INVENTION

1. Technical Field of the Invention

The present invention relates to an in-vehicle camera unit having a camera built into a body. In particular, the present invention is related to the structure of the body of the in-vehicle camera unit.

2. Related Art

Recent year, techniques for equipping an in-vehicle camera on board and using the images taken by the in-vehicle camera are put to practical use. There is a technique for assisting a user to drive a vehicle on the basis of images taken by in-vehicle camera as an example of such techniques (JP-U-1993-32191).

Sometimes the in-vehicle camera is attached to a windshield of the vehicle.

In a case where the windshield of the vehicle slopes forward and downward, the in-vehicle camera is positioned under the windshield. When dew condensation forms on the inside surface of the windshield, the dew drop may fall on the lens of the in-vehicle camera. Alternatively, the dew drop which has fallen on other areas may flow down other surfaces and reach the lens. In this case, the image-recognition capability may be reduced or lost.

SUMMARY

According to the present disclosure, an in-vehicle camera unit which can prevent water drops adhering to a lens is provided. According to one aspect of the present disclosure, an in-vehicle camera unit has a body to which a lens is attached, the lens being exposed to an outside of the body, the body having a top surface to be attached to face a windshield of a vehicle, and, a prevention member configured to prevent water drops from falling on the lens and provided to cross the top surface.

DETAILED DESCRIPTION OF THE PREFERRED EMBODIMENTS

First Embodiment

1. The Configuration of the in-Vehicle Camera Unit

Figure 1:
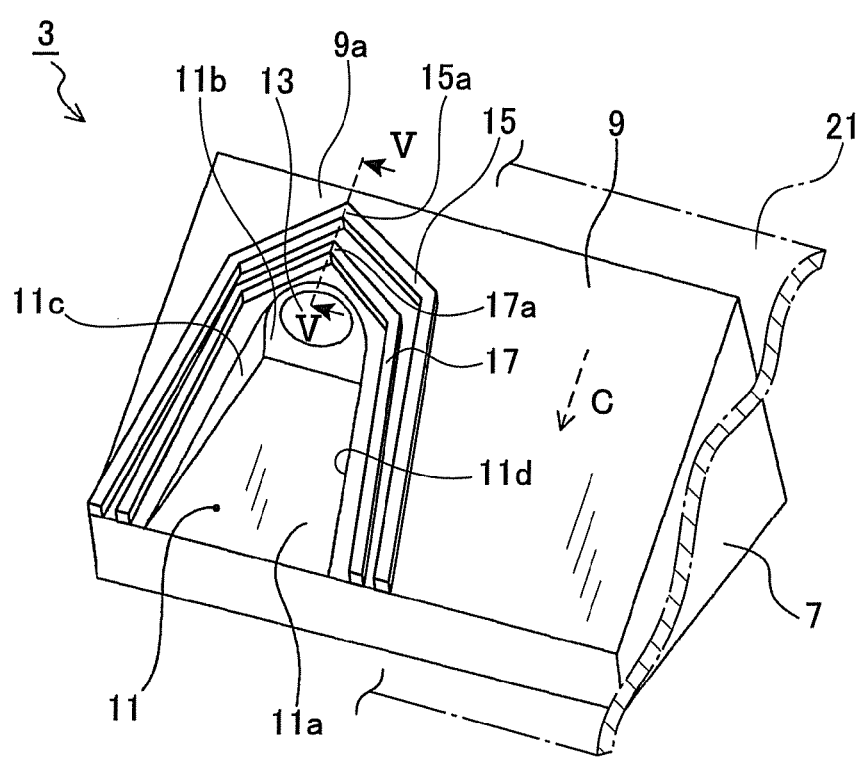
FIG. 1 is a perspective view of a main portion of an in-vehicle camera unit according to a first embodiment.
Figure 2:
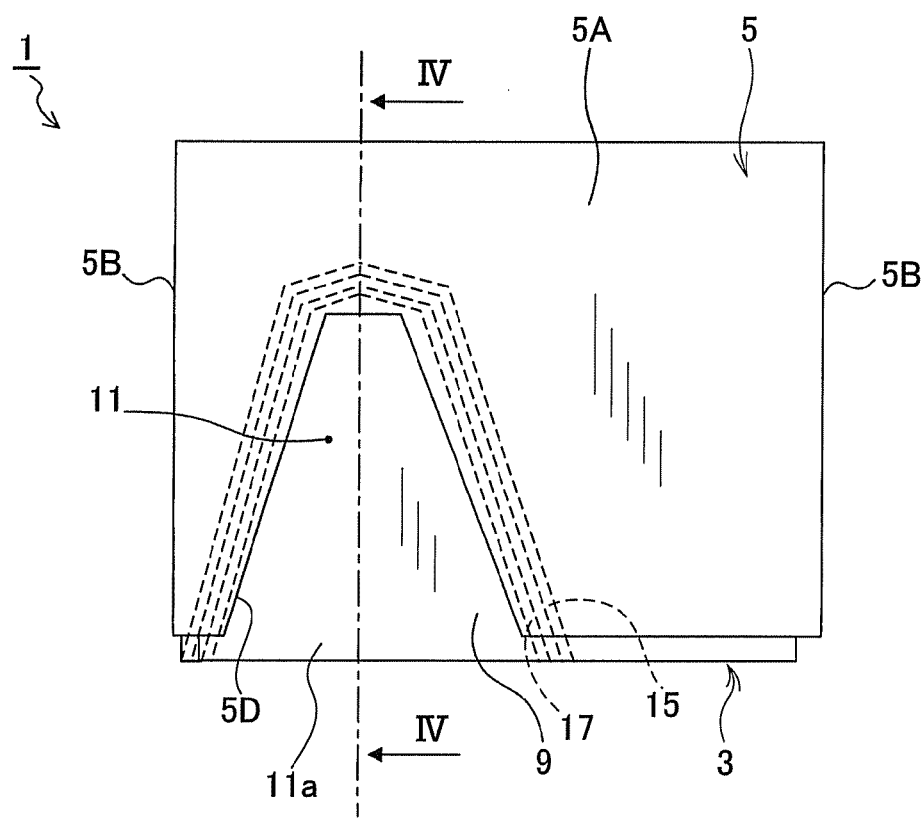
FIG. 2 is a top view of the in-vehicle camera unit according to the first embodiment of the present invention.
Figure 3:
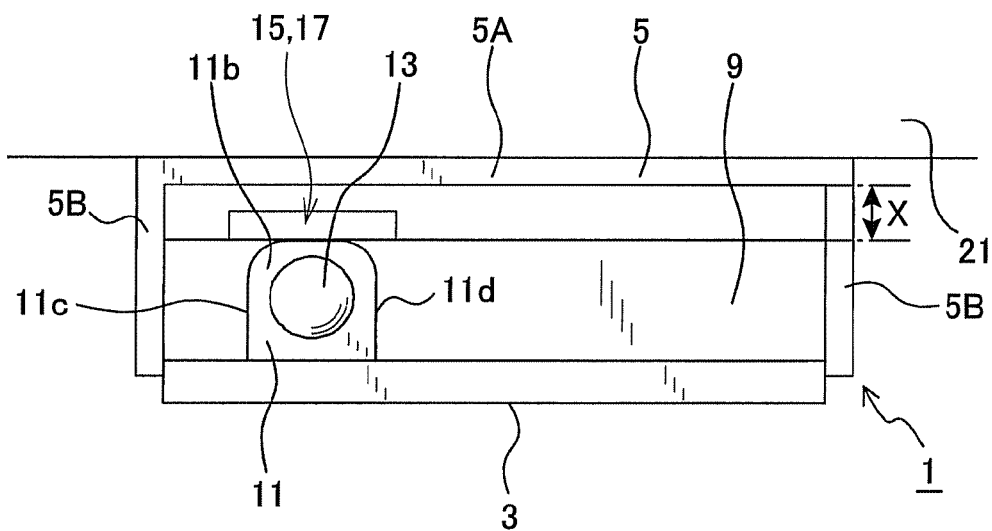
FIG. 3 is a front view of the in-vehicle camera unit according to the first embodiment of the present invention.
Figure 4:
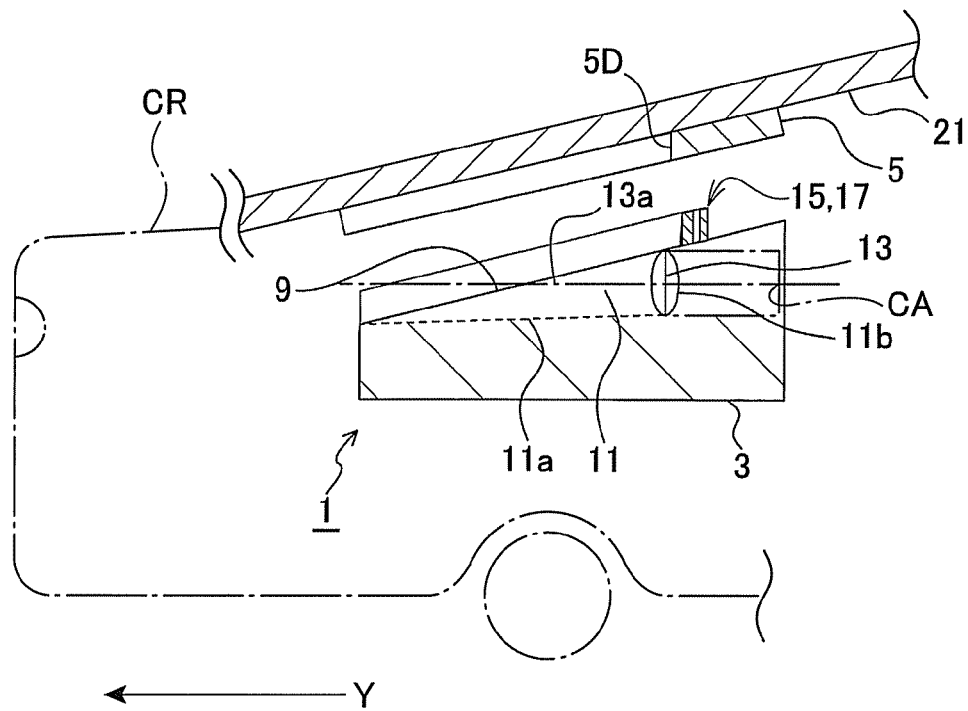
FIG. 4 is a cross sectional side view taken from line IV-IV of FIG. 2.
Figure 5A:
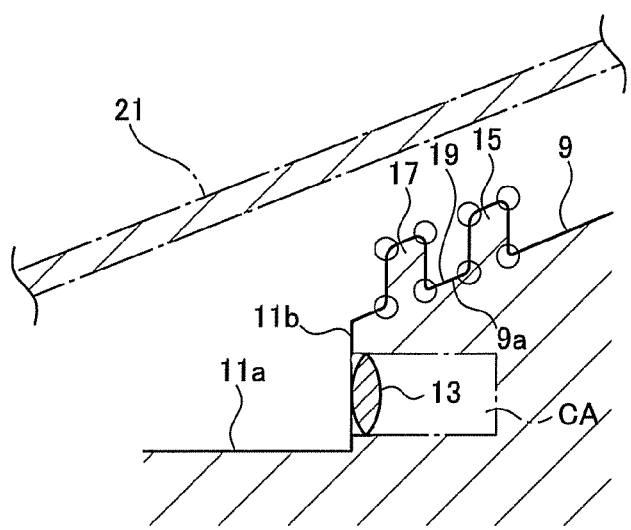
FIG. 5A to FIG. 5D are cross-section views taken from line V-V of FIG. 1, which show prevention members and the periphery of them.

A first embodiment will be described with reference to FIG. 1 to FIG. 5A. FIG. 1 is a perspective view of a main portion 3 of an in-vehicle camera unit 1. The main portion 3 is described below. FIG. 2 is a top view of the in-vehicle camera unit 1. FIG. 3 is a front view of the in-vehicle camera unit 1. FIG. 4 is a cross sectional side view taken from line IV-IV of FIG. 2. FIG. 5A is a cross-section view taken from line V-V which shows prevention members 15, 17 and the periphery of them. The prevention members 15, 17 are described below.

The in-vehicle camera unit 1 has a main portion 3 and bracket 5. As shown in FIG. 1, the main portion 3 has a body 7 and compositions (not shown in figures) of camera CA which are publicly known. The compositions including lens 13 are accommodated in the body 7. The in-vehicle camera unit 1 of this embodiment is attached to a car, with the lens 13 facing the windshield 21 of the car. The windshield 21 slopes forward and downward. The forward direction of the car is indicated by the arrow Y in FIG. 4. The body 7 has a top surface 9 sloping along the windshield 21. With respect to the lens 13, the top surface 9 is oblique in such a way as to be away from the optical axis 13a of the lens 13 with increasing distance from the lens 13 backward of the lens 13. The front-back direction along the top surface 9 is described bellow as the oblique direction C. Thus, by forming the top surface 9 in the same shape as the windshield 21, the in-vehicle camera unit 1 can be stably attached close to the windshield 21.

The recess 11 is formed in the top surface 9. The recess 11 continues to the front end of the top surface 9. The side surfaces 11b, 11c, 11d of the recess 11 are exposed to the front side. The inside bottom 11a of the recess 11 has a lower pitch than the rest portion of the top surface 9 except the recess 11. The lens 13 is attached to the lens attached surface 11b which is the side surface facing forward, so lens 13 is exposed and facing forward. The recess 11 is a space to assure angle of view of the camera.

Two prevention members 15, 17 are provided at the top surface 9. The prevention members 15, 17 surround three directions of the recess 11 except the front direction. That is, the prevention members 15, 17 extend across the oblique direction C on an oblique portion 9a which is a portion of the top surface and positioned backward from the recess 11 (in other words, the oblique portion is the portion which has a rising pitch along the oblique direction C from the lens 13). Further, in this embodiment, the prevention members 15, 17 extend along the periphery of the recess 11 from there to the front end of the top surface 9. In this way the prevention members 15, 17 guide water drops fallen from the windshield 21 to a position where the guided water drops do not hinder the field angle of the camera.

Portions on the oblique portion 9a of the prevention members 15, 17 are made in a nearly V-shape opening to the lens 13 as viewed from the front of the top surface 9. The bend portion 15a, 17a of this V-shaped portion (which is in the middle of the prevention members 15, 17 and facing backward of the oblique direction) is treated with round chamfering, and rounded.

FIG. 5A is cross-section view taken from line V-V of FIG. 2, which shows the prevention members 15, 17 and the periphery of them. Each of the prevention members 15, 17 is a dike (or a protrusion) formed on the top surface 9, and each dike's top is one revel higher than the main of the top surface 9. Thus, the prevention members 15, 17 form a structure bearing two dikes provided along the oblique direction. The prevention members 15, 17 have the same cross-section shape in any portion.

The edges of the prevention members 15,17 are rounded by round chamfering, as the edges are circled in FIG. 5A. The crooked portion in the top and base of the dike has curved surface. The prevention members 15, 17 of this embodiment are provided at some interval 19 where there is not a dike, trench and so on, and which is a flat surface.

The main portion 3 of the in-vehicle camera unit 1 is attached to the windshield 21 by using a bracket 5. The bracket 5, in FIG. 2 to FIG. 4, has a flat plate-like attachment portion 5A and a pair of holding portions 5B, 5B. The plate-like holding portions 5B, 5B respectively hang down from both ends of the attachment portion 5A. The bracket 5, in FIG. 3, holds the main portion 3 such that the both side surface of the main portion 3 are respectively fixed to holding portions 5B, 5B. The bracket 5 is attached to the windshield 21 by bonding the top surface of the attachment portion 5A.

In a state where the in-vehicle camera unit 1 is attached to the windshield 21 through the bracket 5, the lens 13 of the in-vehicle camera unit 1 is directed forward of the vehicle, and the top surface 9 slopes forward and downward. In this state, as shown in FIG. 3, the attachment portion 5A of the bracket 5 and the top surface of the main portion 3 face each other, keeping predetermined distance X between each other. The top surfaces 9 of the main portion 3 faces the windshield 21, sandwiching the attachment portion 5A between them. Keeping the predetermined distance X can prevent dew drops from flowing down the bracket 5 to the lens 13.

A cutout portion 5D of the bracket 5, in FIG. 2, is formed by cutting out a portion of the attachment portion 5A facing the recess 11. This structure prevents the bracket 5 hindering the angle of view of the in-vehicle camera unit 1. A portion of the attachment portion 5A facing the prevention members 15, 17 may be cut out. This structure can prevent dew drops which have adhered to the bracket 5 from falling on the lens 13.

For example, the body 7 and the prevention member 15, 17 may be made from metal materials by die-casting.

2. Effects of the in-Vehicle Unit 1 According to this Embodiment (1) The windshield 21 and the attachment portion 5A of the bracket 5 face the top surface 9 of the in-vehicle camera unit 1. The dew drops on the inside surface of the windshield 21 may fall on the top surface 9 directly or through the attachment portion 5A. As dew drops fall on the oblique portion 9a which is a portion of the top surface 9 positioned backward from the lens 13, the dew drops are inclines to flow down to the lens 13 because the top surface 9 slopes forward and downward.

In this case, the in-vehicle camera unit 1 can prevent the dew drop from adhering to the lens 13 by the prevention members 15, 17 provided to surround the recess 11 where the lens 13 is attached.

(2) The prevention members 15, 17 form a structure which bearing two dikes provided along the oblique direction. Thus the effect of the prevention of water drops is further increased.

Further these structures enable to prevent water drops from falling without making a projection of a dike or a step higher too much. The effect of the prevention of water drops is increased by making the top surface of the projection to slope.

(3) The prevention members 15, 17 is made in nearly V-shape opening to the lens 13. This structure can change the direction of the water drops that have flowed down the oblique portion 9a toward left or right, so it prevents the water drops from adhering to the lens 13.

(4) The prevention members 15, 17 are provided at interval. Thus the effect of the prevention of water drops is further increased. This structure can extend lifetime of a mold or die as the body 7 is made by using the mold or die.

(5) Each of the edges of the prevention members 15, 17 is treated with round chamfering to be rounded. The bend portion 15a, 17a are also treated with round chamfering, and rounded. These structure enable water drops to spread on the top surface 9 and change from a mass which easily fall into a state which hardly fall, so it prevent the water drops from falling on the lens 13. Thus the effect of preventing water drops from adhering to the lens 13 is further increased.

(6) It is easy to attach the in-vehicle camera unit 1 having the bracket 5 to a vehicle.

3. A Test for Confirming the Effect of the in-Vehicle Camera Unit 1

In FIG. 3, water drops were dropped on 3 points P, Q, R in the main portion 3, and the flows of the water drops were observed. As a result, in any cases it was confirmed that water drops had been prevented from reaching the recess by the prevention members 15, 17.

On the other hand, the same tests as described above were performed, using a main portion which basically had the same structure as the main portion 3 of this embodiment but didn't have prevention members 15, 17. As a result, it was observed that water drops had reached the recess and had adhered to the lens 13.

Second Embodiment

Figure 7:
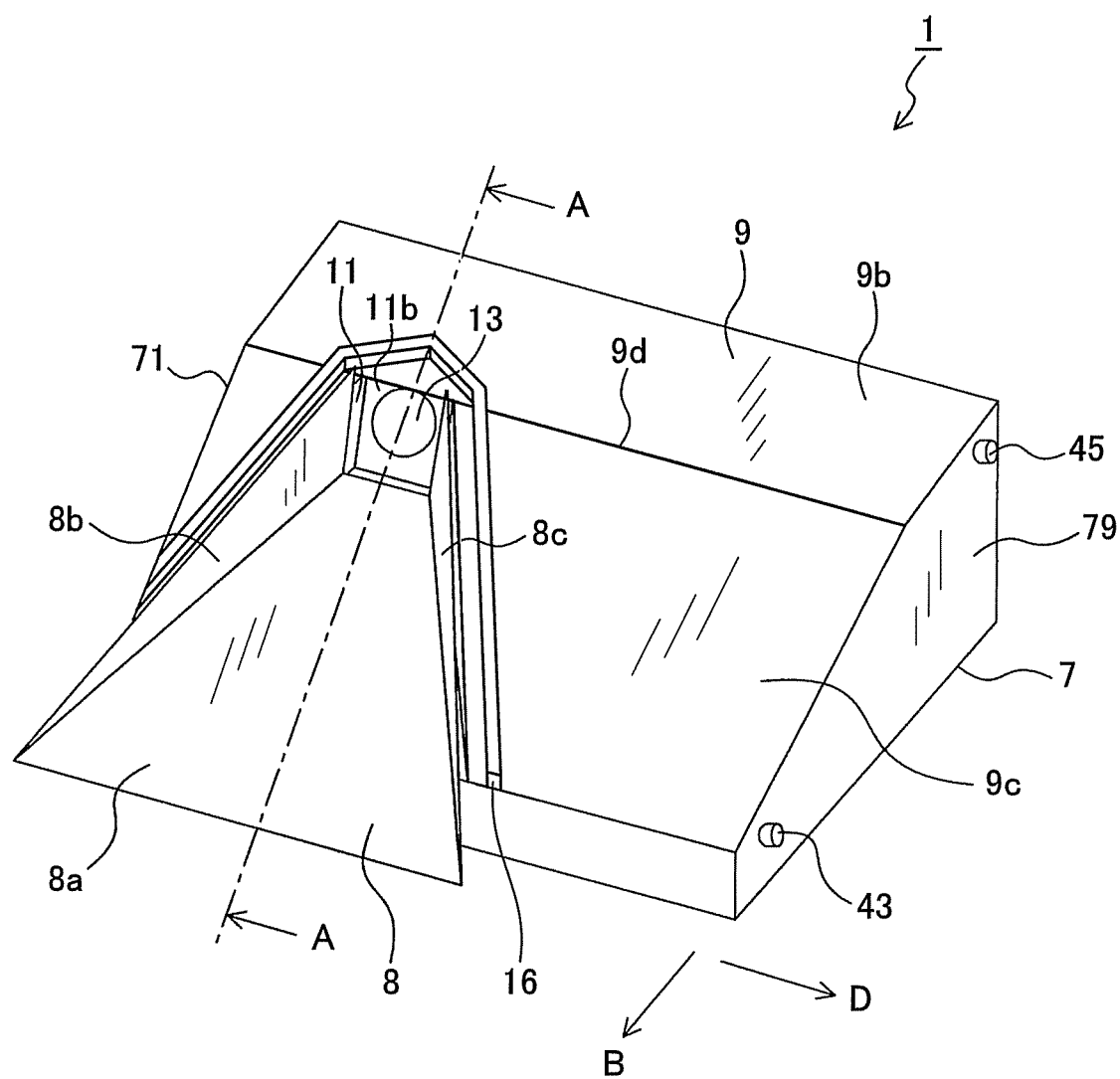
FIG. 7 is a perspective view of an in-vehicle camera according to an embodiment.
Figure 8:
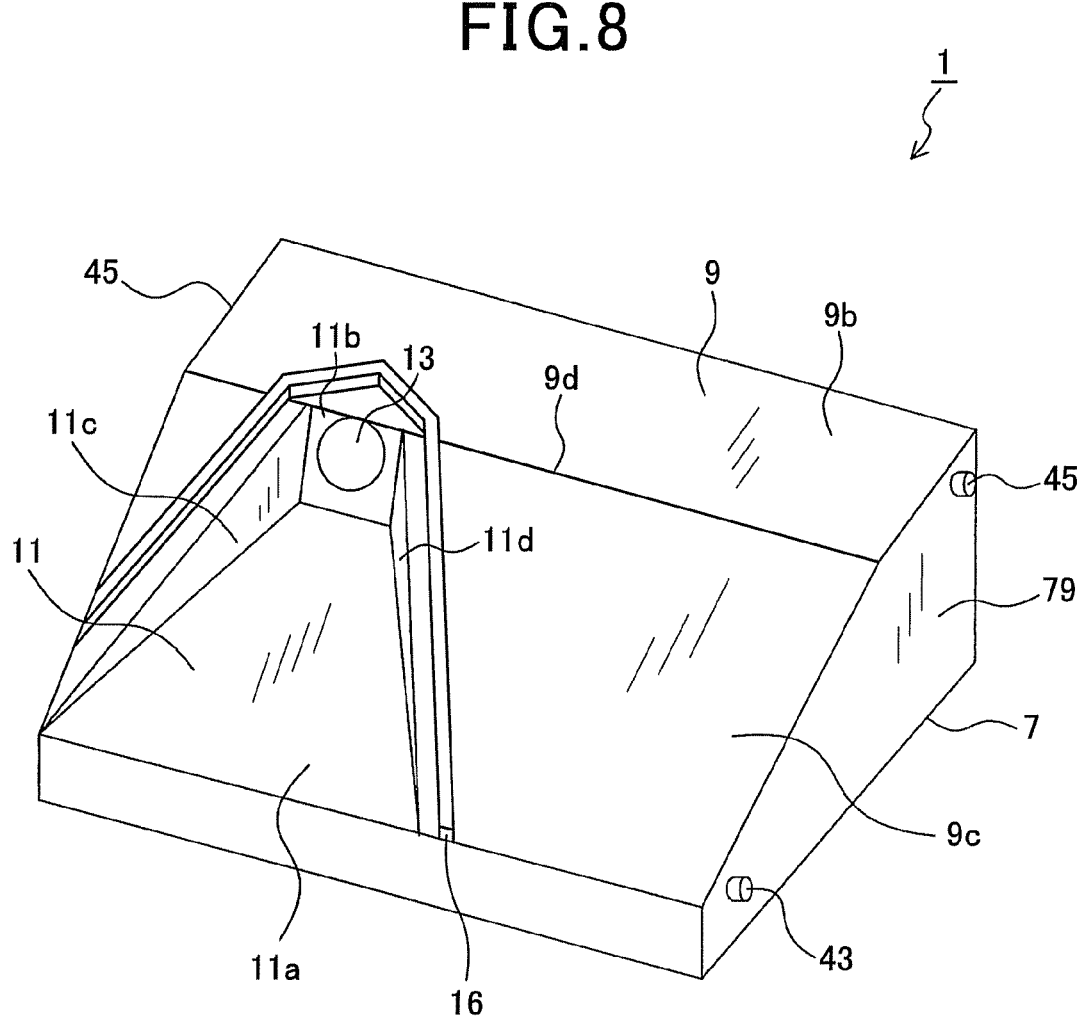
FIG. 8 is a perspective view of the in-vehicle camera (from which a hood is removed)
Figure 9:
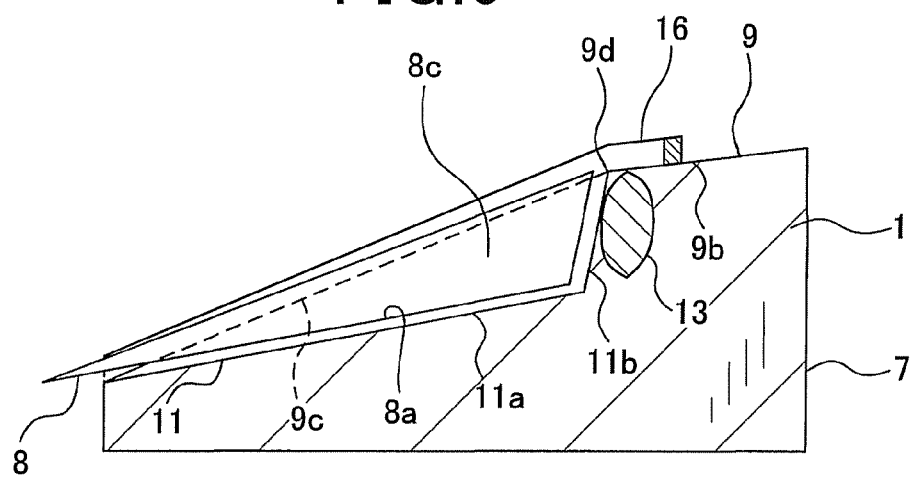
FIG. 9 is a sectional side view taken along a line A-A in FIG. 1.
Figure 10:
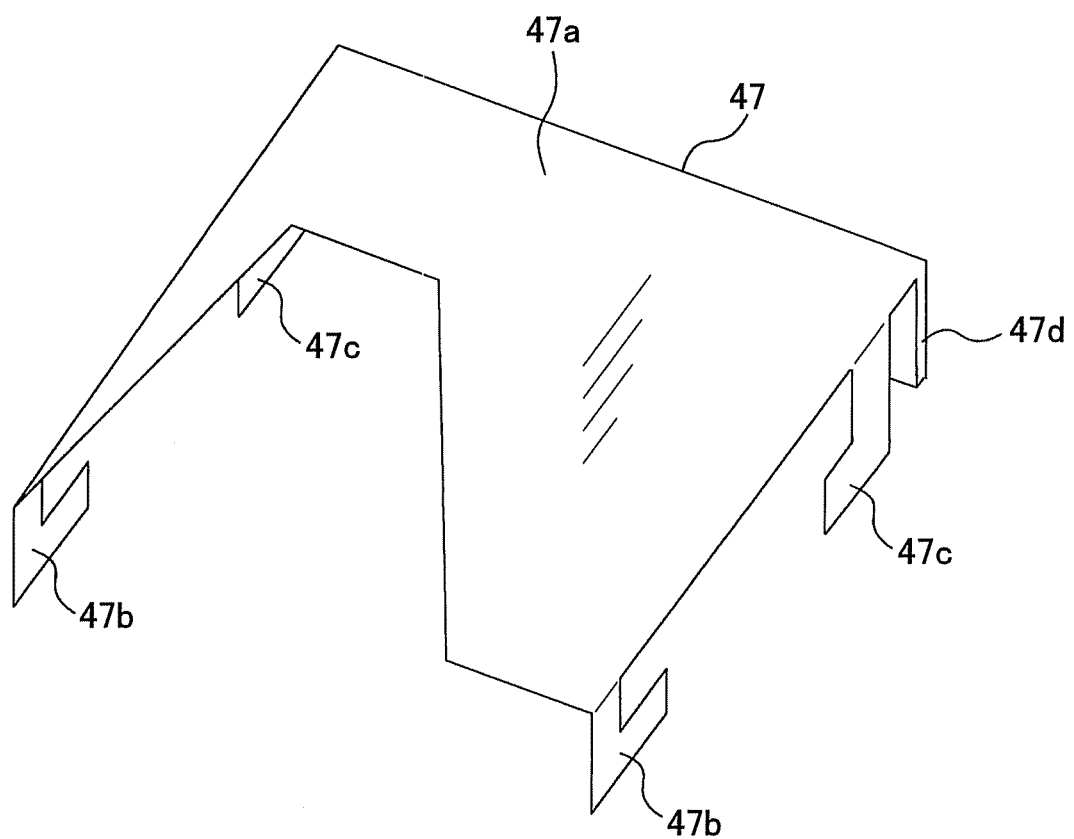
FIG. 10 is a perspective view of a bracket.
Figure 11:
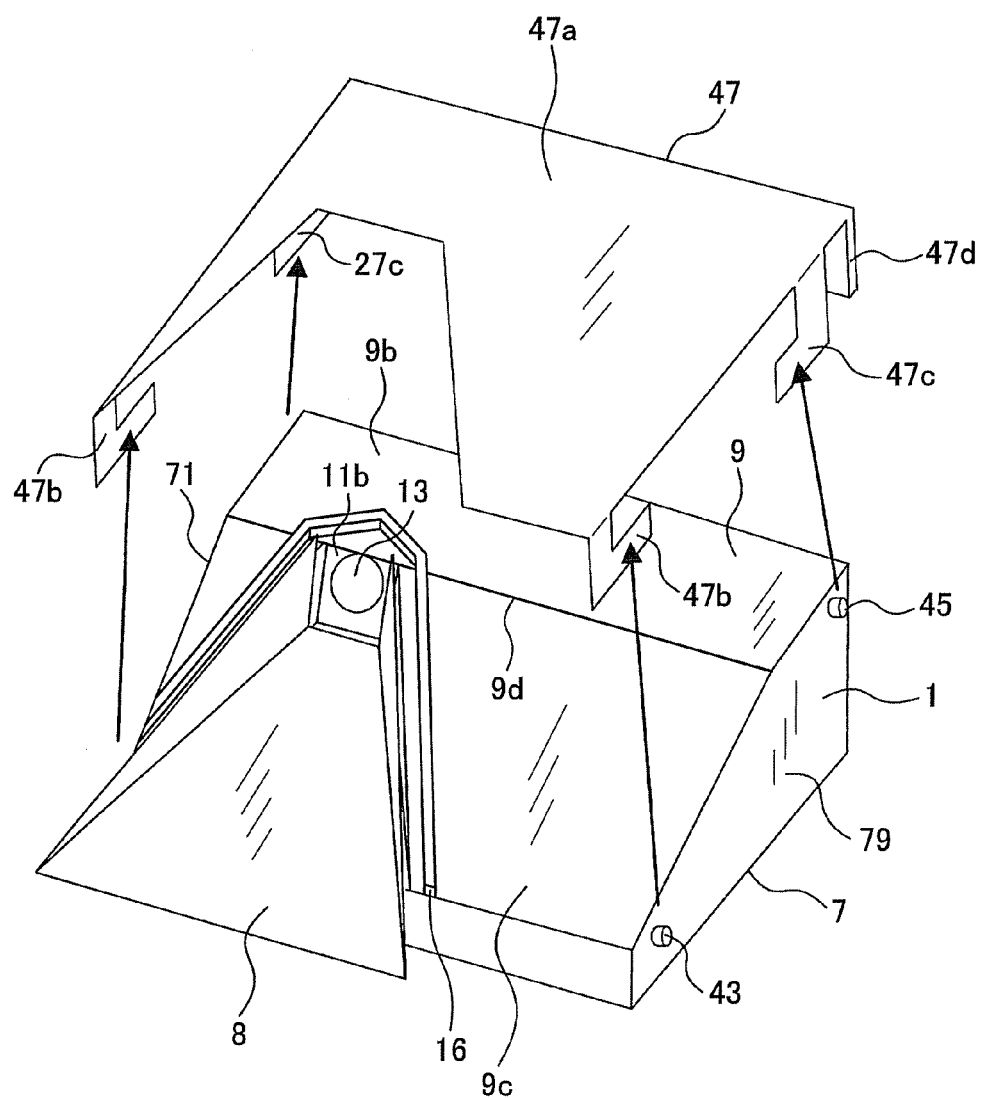
FIG. 11 is a diagram for explaining a method of attaching the in-vehicle camera to the bracket.
Figure 12:
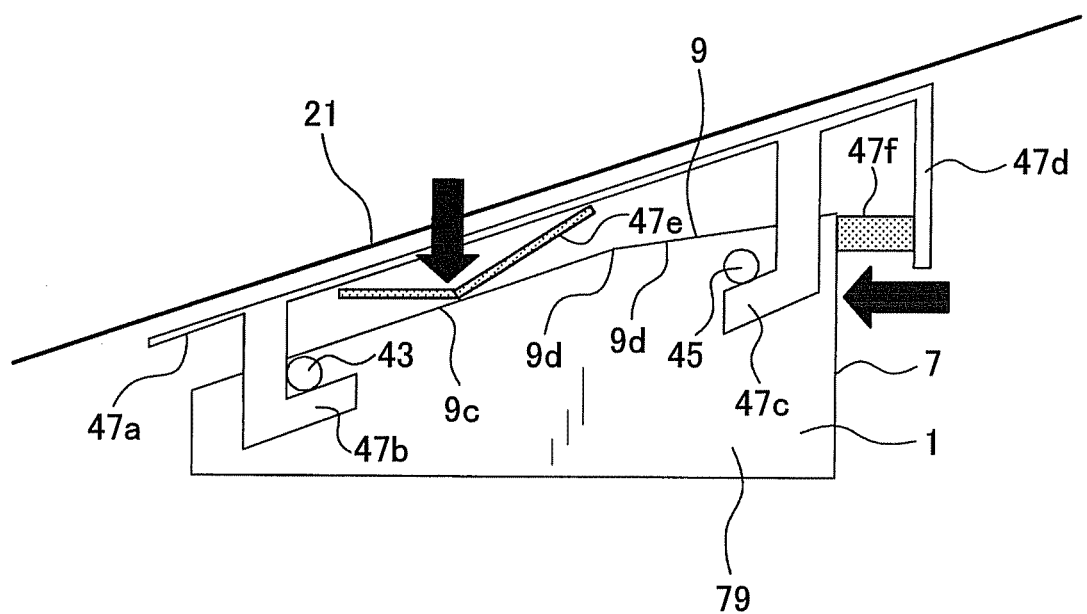
FIG. 12 is a diagram for explaining a state in which the in-vehicle camera is attached to the bracket.

Hereinafter, the configuration of the in-vehicle camera 1 will be described with reference to FIGS. 7 to 12. FIG. 7 is a perspective view of the in-vehicle camera 1. FIG. 8 is a perspective view of the in-vehicle camera 1 (from which a hood 8 described later has been removed). FIG. 9 is a sectional side view taken along a line A-A in FIG. 7. FIG. 10 is a perspective view of a bracket 47 described later. FIG. 11 is a diagram for explaining a method of attaching the in-vehicle camera 1 to the bracket 47. FIG. 12 is a diagram for explaining a state in which the in-vehicle camera 1 is attached to the bracket 47.

The in-vehicle camera 1 is attached in a vehicle interior. As shown in FIGS. 7 and 8, the in-vehicle camera 1 includes a body 7, a prevention member 16 and components (not shown) of a well-known camera housed in the body 7. All of the top surface 9 of the body 7 is inclined downward toward the front side (in the direction B shown in FIG. 7, i.e. a direction which a lens 13 of the in-vehicle camera faces). The top surface 9 is divided into a top face front portion 9c and a top face rear portion 9b by a ridge line 9d passing through the top surface. The ridge line 9d is parallel to the direction D perpendicular to the direction B (refer to FIG. 7). The top face front portion 9c is a flat surface except for a recess 11 described later. The top face rear portion 9b is also a flat surface. The inclination angle of the top face front portion 9c (except the recess 11) is greater than the inclination angle of the top face rear portion 9b. Hence, as shown in FIG. 9, when viewing the in-vehicle camera 1 from the side, the top surface 9 has a bent angular shape in which the ridge line 9d is the top (inflection point).

The top face front portion 9c has the recess 11 in a portion thereof including the front end. The recess 11 is concaved with respect to the periphery thereof. As shown in FIG. 8, the recess 11 includes an inside bottom 11a, a lens attached face 11b and a pair of right-and-left side faces 11c, 11d. The inclination angle of the inside bottom 11a is less than those of other portions of the top face front portion 9c. The lens attached face 11b sharply and almost vertically stands at the rear side with respect to the inside bottom 11a and faces toward the front side. The lens 13 is mounted on the lens attached face 11b. That is, the lens 13 is exposed at the top face front portion 9c.

The rear end of the recess 11 reaches the ridge line 9d. The top edge of the lens attached face 11b is aligned with the ridge line 9d. The top of the lens 13 contacts the ridge line 9d. Hence, the lens 13 is positioned in the vicinity of the ridge line 9d.

The prevention member 16 is provided at the periphery of the lens 13 on the top surface 9. In this embodiment, the prevention member 16 is formed from the periphery of the lens to the front end of the body 7. In other words, the prevention member 16 extends in the cross direction (a direction crossing the front-back direction) of the body 7 and forward. The prevention member 16 is formed to project from the top surface 9.

In addition, as shown in FIG. 7, the in-vehicle camera 1 includes the hood 8 attached to the recess 11 of the body 7. The hood 8 includes a bottom face portion 8a and a pair of side face portions 8b, 8c which are provided so as to stand at both right and left sides of the bottom face portion 8a. When the hood 8 is attached to the recess 11, the bottom face portion 8a and the side face portions 8b, 8c are brought into contact with the inside bottom 11a and the side faces 11c, 11d, respectively. In this state, the bottom face portion 8a projects further than the body 7 toward the front side. The top edges of the side face portions 8b, 8c are inclined substantially to the same extent as the top face front portion 9c, and project slightly longer than the top face front portion 9c to the top side.

Cylindrical projections 43, 45 are respectively provided on side faces 79, 71 positioned in the lateral direction of the body 7.

The in-vehicle camera 1 has a bracket 47. The body 7 of the in-vehicle camera 1 is attached to the windshield 21 of the vehicle by the bracket 47 shown in FIG. 10. The bracket 47 includes a top board 47a, latches 47b, 47c, a rear board 47d, a plate spring 47e, and a plate spring 47f. The top board 47a is bonded to the windshield 21. The latches 47b, 47c project downward at both right-and-left ends of the under surface of the top board 47a. The rear board 47d projects downward at the rear end of the under surface of the top board 47a. The plate spring 47e is provided at the center of the under surface of the top board 47a. The plate spring 47f is provided on the front side of the rear board 47d.

The body 7 is attached to the bracket 47 as described below. The latches 47b, 47c of the bracket 47 have L shapes. As shown in FIG. 12, the latches 47b, 47c latch the projections 43, 45 of the body 7 to suspend the body 7 so as not to fall. In addition, as shown in FIG. 12, the plate spring 47e biases the body 7 downward. The plate spring 47f biases the body 7 forward. As a result, the bracket 47 can fix the body 7 without rattling.

As described above, the bracket 47 is fixed to the windshield 21 from the inside of the vehicle by bonding the top board 47a to the windshield 21. Hence, when the body 7 is attached to the bracket 47, the in-vehicle camera 1 is attached to the windshield 21. In this case, the top surface 9 of the body 7 is opposed to the windshield 21.

Other Embodiments

Other embodiments will be described with reference to FIG. 5B to FIG. 5D.

The present invention is not limited to the above-described embodiments. Modifications can be made accordingly without departing from the scope of the present invention.

Figure 5B:
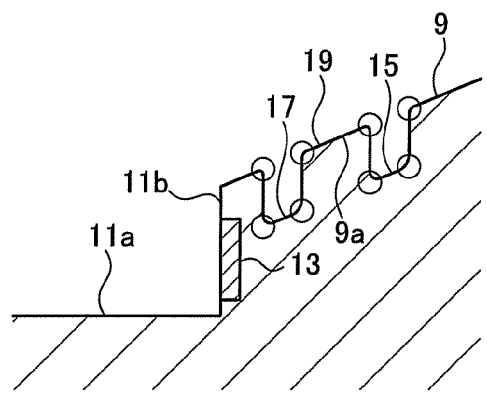
Figure 5C:
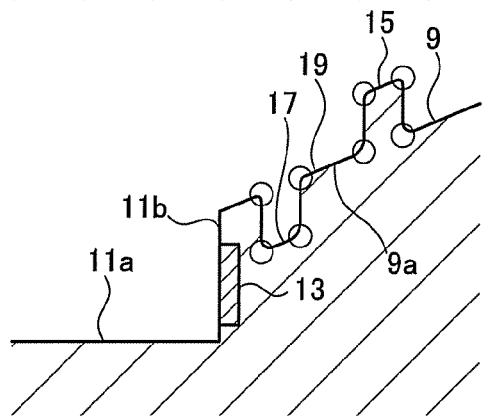

For example, in FIG. 5B, trenches the bottoms of which are lower than the top face 9 may be made as prevention members 15, 17. In FIG. 5C the prevention member 15 may be the dike, and the prevention member 17 may be the trench. Alternatively, the prevention member 17 may be the dike, and the prevention member 15 may be the trench.

Figure 5D:
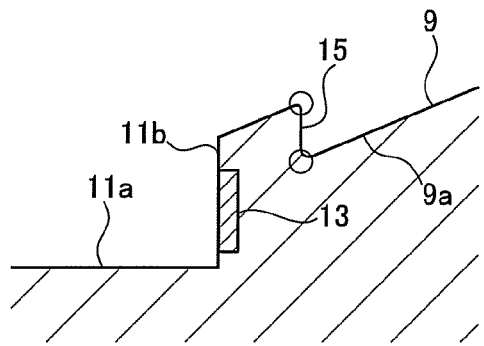
Figure 6:
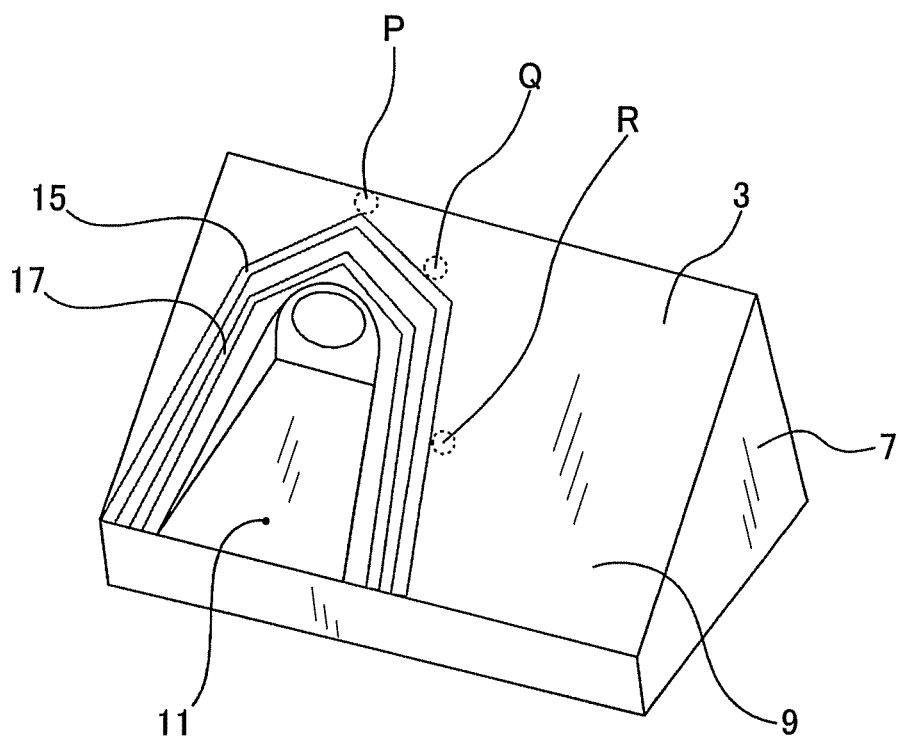
FIG. 6 is a perspective view of the in-vehicle camera unit which shows the method of the test for effect confirmation of the in-vehicle camera unit.

In FIG. 5D a step the top surface of which is higher than the top surface 9 may be made as a prevention member 15.

The number of prevention members is not limited to 2. For example, only a prevention member may be provided, and 3, 4, 5 or more prevention members may be provided.

The prevention members 15, 17 may have right-angled edges without round chamfering.

As viewed from the front of the top surface 9, the shapes of the prevention members 15, 17 are not limited to V-shapes, but other shapes are allowed. For example, the prevention members 15, 17 may be formed in a U-shape opening to the lens 13, as viewed from the front of the top surface 9.

The prevention members 15, 17 are not limited to the structure which has the interval between each other, and a structure which has no interval may be allowed. For example, by piling the prevention member on top of another, the prevention members 15, 17 may be formed in stair-like shapes.

The bracket 5 may be attached to an inside of a roof or to a place astride an inside of a roof and the windshield 21. The in-vehicle camera unit 1 may be attached to a back window or the periphery of the back window, and take an image of backward of a vehicle. In that case, the direction of the in-vehicle camera unit is opposite to the one of the in-vehicle camera unit for taking an image of front of a vehicle. Alternatively, the in-vehicle camera unit 1 may be attached to a side window or the periphery of the side window, and take an image of side of a vehicle. In that case, the direction of the in-vehicle camera unit is set by rotating the direction of the in-vehicle camera unit for taking an image of front of a vehicle approximately 90 degree.

The prevention members 15, 17 do not have to surround all three direction of the recess 11. For example, they may be provided only in the area of the oblique portion 9a which can cover the width of the recess 11 (or the lens 13).

What is claimed is:

1. An in-vehicle camera unit comprising:
a body to which a lens is attached, the lens being exposed to an outside of the body, the body having a top surface to be attached to face a windshield of a vehicle; and a prevention member configured to prevent water drops from falling on the lens and provided to cross the top surface.

2. The in-vehicle camera unit according to claim 1, wherein the prevention member is formed from a periphery of the lens to a front end of the body.

3. The in-vehicle camera unit according to claim 1, further comprising a bracket configured to support the body by holding both sides of the body.

4. The in-vehicle camera unit according to claim 1, wherein:
   the top surface has a shape bent at a ridge line passing through the top surface;
   the lens is disposed in the vicinity of the ridge line; and
   the prevention member is provided adjacent to lens.

5. The in-vehicle camera unit according to claim 1, further comprising a bracket configured to hold the body,
   wherein
   the bracket has a bias member provided behind the body and configured to bias the body forward.

* * * * *